(12) United States Patent
Kim

(10) Patent No.: US 6,351,052 B1
(45) Date of Patent: Feb. 26, 2002

(54) METHOD OF WINDING ARMATURE COIL AND CORELESS MOTOR PRODUCED THROUGH SUCH METHOD

(75) Inventor: Sang-Myun Kim, Cheungju (KR)

(73) Assignee: Ja Hwa Electronics Co., Ltd., ChungcheungBuk-Do (KR)

(*) Notice: Subject to any disclaimer, the term of this patent is extended or adjusted under 35 U.S.C. 154(b) by 0 days.

(21) Appl. No.: 09/611,476

(22) Filed: Jul. 7, 2000

(51) Int. Cl.7 .................................................. H02K 1/00
(52) U.S. Cl. ........................ 310/179; 310/185; 310/195; 310/198; 29/596
(58) Field of Search ................................. 310/179, 184, 310/185, 195, 198, 208, 211, 216; 29/596, 598

(56) References Cited

U.S. PATENT DOCUMENTS

| | | | |
|---|---|---|---|
| 2,553,292 A | * 5/1951 | Barrett | 171/252 |
| 2,759,116 A | * 8/1956 | Glass | 310/171 |
| 3,191,081 A | * 6/1965 | Faulhaber | 310/154 |
| 3,209,187 A | * 9/1965 | Angele | 310/266 |
| 3,237,036 A | * 2/1966 | Konig | 310/266 |
| 3,360,668 A | * 12/1967 | Faulhaber | 310/195 |
| 3,624,439 A | * 11/1971 | Tokutomi | 310/154 |
| 4,103,196 A | * 7/1978 | Saito et al. | 310/266 |
| 4,110,901 A | * 9/1978 | Nakamura et al. | 29/598 |

* cited by examiner

Primary Examiner—Burton S. Mullins
Assistant Examiner—Thanh Lam
(74) Attorney, Agent, or Firm—Nawrocki, Rooney & Sivertson, P.A.

(57) ABSTRACT

The present invention provides a method of winding an armature coil on a cylindrical resin insulator of coreless motors while improving magnetic flux efficiency of the coil. This method allows a resulting motor to effectively generate desired torque by an application of a low current, thus conserving electricity. This method also simplifies the production process of the coreless motors, thus reducing the production cost of the motor and improving productivity and economical efficiency of the motors. In order to wind an armature coil on an insulator, the coil is repeatedly wound on the insulator, with each turn of the coil linearly extending on the upper surface, vertically extending down on the sidewall and linearly extending on the lower surface prior to vertically extending up on the sidewall of the insulator. In another embodiment, the coil may be repeatedly wound on the insulator in a way such that each turn of the coil extends on the upper surface while passing over the sidewall of an upper center projection of the insulator, vertically extends down on the sidewall and extends on the lower surface while passing over the sidewall of a lower center projection prior to vertically extending up on the sidewall of the insulator.

7 Claims, 7 Drawing Sheets

METHOD OF WINDING ARMATURE COIL AND CORELESS MOTOR PRODUCED THROUGH SUCH METHOD

BACKGROUND OF THE INVENTION

1. Field of the Invention

The present invention relates, in general, to a method of winding an armature coil on a cylindrical resin insulator of coreless motors and to a coreless motor produced through such a coil winding method and, more particularly, to an armature coil winding method, designed to allow a resulting coreless motor to effectively generate desired torque by an application of a low current so as to conserve electricity, and to simplify the production process of the motor so as to reduce the production cost of the motor, thus finally improving productivity and economical efficiency of the coreless motors, the present invention also relating to a coreless motor produced through such a coil winding method.

2. Description of the Prior Art

As well known to those skilled in the art, coreless motors are preferably used in portable communication instruments, such as pagers and cellular phones, so as to vibrate the instruments in the case of a calling of the instruments in a vibration mode.

Nowadays, many people use portable communication instruments, such as pagers and cellular phones, in accordance with a rapid development in the information intensive society. Conventional pagers and cellular phones (hereinbelow, referred to simply as "cellular phones") are typically designed to inform users of an incoming call through either a sound or vibration signal. In a crowded area, some users of such cellular phones preferably select or are forced to select a vibration mode in place of a sound mode since a sound signal may disturb those around the users. Coreless motors are set within cellular phones to accomplish such a vibration mode of the phones.

FIGS. 1 and 2 show conventional cup-type and bell-type armature coils of such coreless motors. Technology of such conventional armature coils of coreless motors may be preferably referred to some technical documents, for example, page 88 of "Manual of Control Motors, the Third Edition" published by Sewoon Publishing Company of Korea on Feb. 5, 1995. As shown in FIG. 1, the conventional cup-type armature coil 1 has a cylindrical shape and consists of upper, middle and lower coil parts, with a shaft 2 axially passing through the center of the coil 1. At the upper and lower coil parts 3 and 4 of the armature coil 1, a coil is slantly wound at an angle of θ. However, at the middle coil part 5 of the armature coil 1, the coil is vertically wound at an angle of 90°.

Because of slantly wound coils of the upper and lower parts of the cup-type armature coil, the magnetic flux generated is not so effective that the torque is accordingly reduced. That is, when a current flows in the cup-type armature coil, the coil merely generates an ineffective magnetic flux, and so the torque is undesirably reduced by 1−sin θ. This is explained by the expression, F=Bil sin θ, wherein F is torque, B is a magnetic flux density, i is a current, l is a length of the conductive wire, and θ is an angle between the current flowing in the conductive wire and an outside magnetic field.

That is, when the coils of the upper and lower coil parts 3 and 4 of the armature coil 1 are slantly wound at an angle of θ (=60°), the torque is undesirably reduced by about 13.4% in comparison with the torque of the middle coil part 5 having a coil winding angle of 90° since sin 60° is less than sin 90° (=1). In a brief description, the cup-type armature coil 1 of FIG. 1 merely generates low torque and always has low magnetic flux efficiency due to the slantly wound coils at the upper and lower coil parts 3 and 4.

As shown in FIG. 2, the conventional bell-type armature coil 1 is formed by diagonally winding a coil at an angle of θ, with a shaft 2 axially passing through the center of the coil 1. Due to such a diagonally wound coil, the bell-type armature coil merely generates an ineffective magnetic flux when a current flows in the coil, and so the torque is undesirably reduced by 1−sin θ. Therefore, the bell-type armature coil 1 does not generate full magnetic flux efficiency in the same manner as that described for the conventional cup-type armature coil of FIG. 1.

Therefore, the conventional armature coils of FIGS. 1 and 2, having low magnetic flux efficiency due to the slantly wound coils, have a low operational performance of conventional coreless motors. This adversely results in consuming more electricity to operate the motor properly and to generate a desired torque. Another problem of the conventional armature coils resides in that the production process of the coreless motors is complex, thus reducing productivity of the motors and increasing the production cost of the motors and thereby reducing economical efficiency of the motors.

SUMMARY OF THE INVENTION

Accordingly, the present invention has been made keeping in mind the above problems occurring in the prior art, and an object of the present invention is to provide a method of winding an armature coil, which winds the coil on a cylindrical resin insulator while maximizing magnetic flux efficiency of the coil and allows a resulting coreless motor to effectively generate desired torque by an application of a low current so as to conserve electricity, and to simplify the production process of the motor so as to reduce the production cost of the motor, thus finally improving productivity and economical efficiency of the coreless motors, Another object of the present invention is to provide a coreless motor produced through such a coil winding method.

In order to accomplish the above object, the primary embodiment of the present invention provides a method of winding an armature coil on a cylindrical resin insulator of coreless motors, comprising the step of repeatedly winding the coil on the insulator in a way such that each turn of the coil primarily linearly extends on the upper surface of the insulator, vertically extends down on the sidewall of the insulator, and linearly extends on the lower surface of the insulator prior to vertically extending up on the sidewall of the insulator.

In an armature coil winding method according to the second embodiment of this invention, the coil is repeatedly wound on the cylindrical resin insulator in a way such that each turn of the coil primarily extends on the upper surface of the insulator while passing over the sidewall of an upper center projection of the insulator, vertically extends down on the sidewall of the insulator, and extends on the lower surface of the insulator while passing over the sidewall of a lower center projection prior to vertically extending up on the sidewall of the insulator.

The armature coil winding method of this invention improves magnetic flux efficiency of the coil, thus allowing a resulting coreless motor to precisely vibrate. The coreless motors, produced through the coil winding method of this invention, have improved operational reliability and improve the operational efficiency, operational reliability and market competitiveness of resulting cellular phones.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
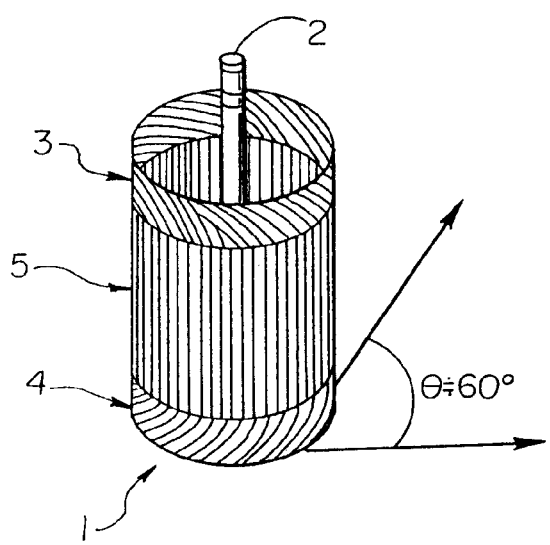
FIG. 1 is a perspective view, showing the construction of a conventional cup-type armature coil of coreless motors.
Figure 2:
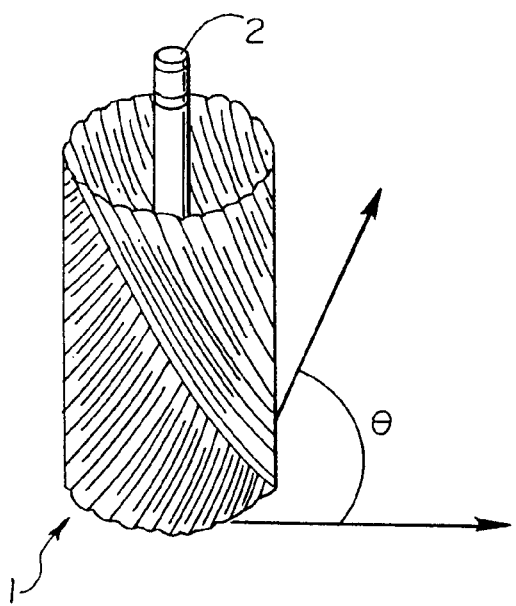
FIG. 2 is a perspective view, showing the construction of a conventional bell-type armature coil of coreless motors.

Reference now should be made to the drawings, in which the same reference numerals are used throughout the different drawings to designate the same or similar components. It should be understood that some operational functions and elements of an armature coil according to this invention, well known to those skilled in the art, may be not described in the following description as they may confuse a complete comprehension of this invention.

In addition, some technical terms, used in the following description, may be replaced with more appropriate terms if the change does not affect the functioning of this invention.

Figure 3:
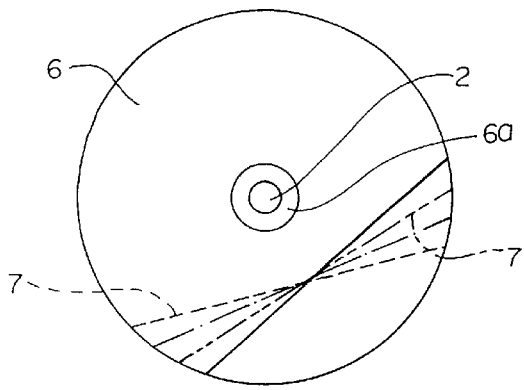
FIG. 3 is a view, schematically showing an armature coil winding method in accordance with the primary embodiment of the present invention.
Figure 4A:
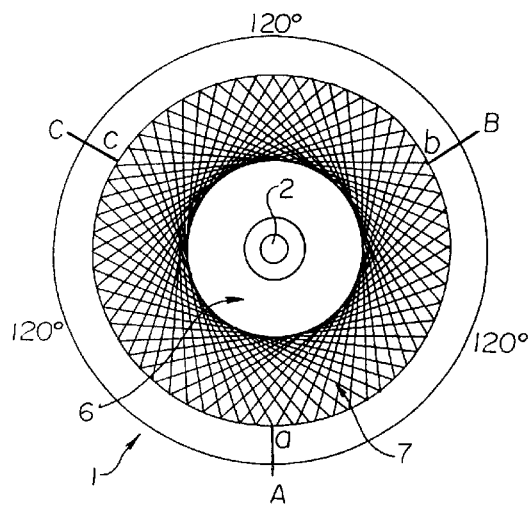
FIGS. 4a and 4b are plan views, showing the armature coil winding method in accordance with the primary embodiment of this invention.
Figure 4B:
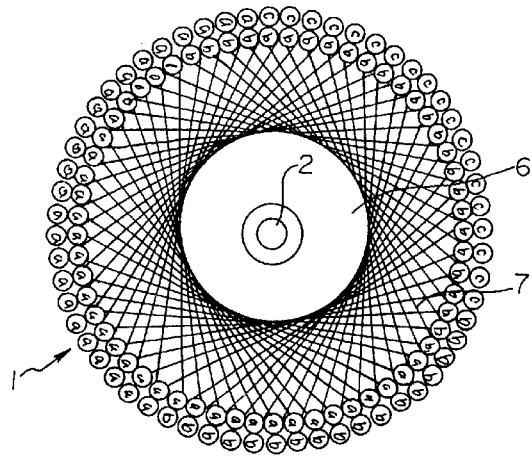
Figure 5:
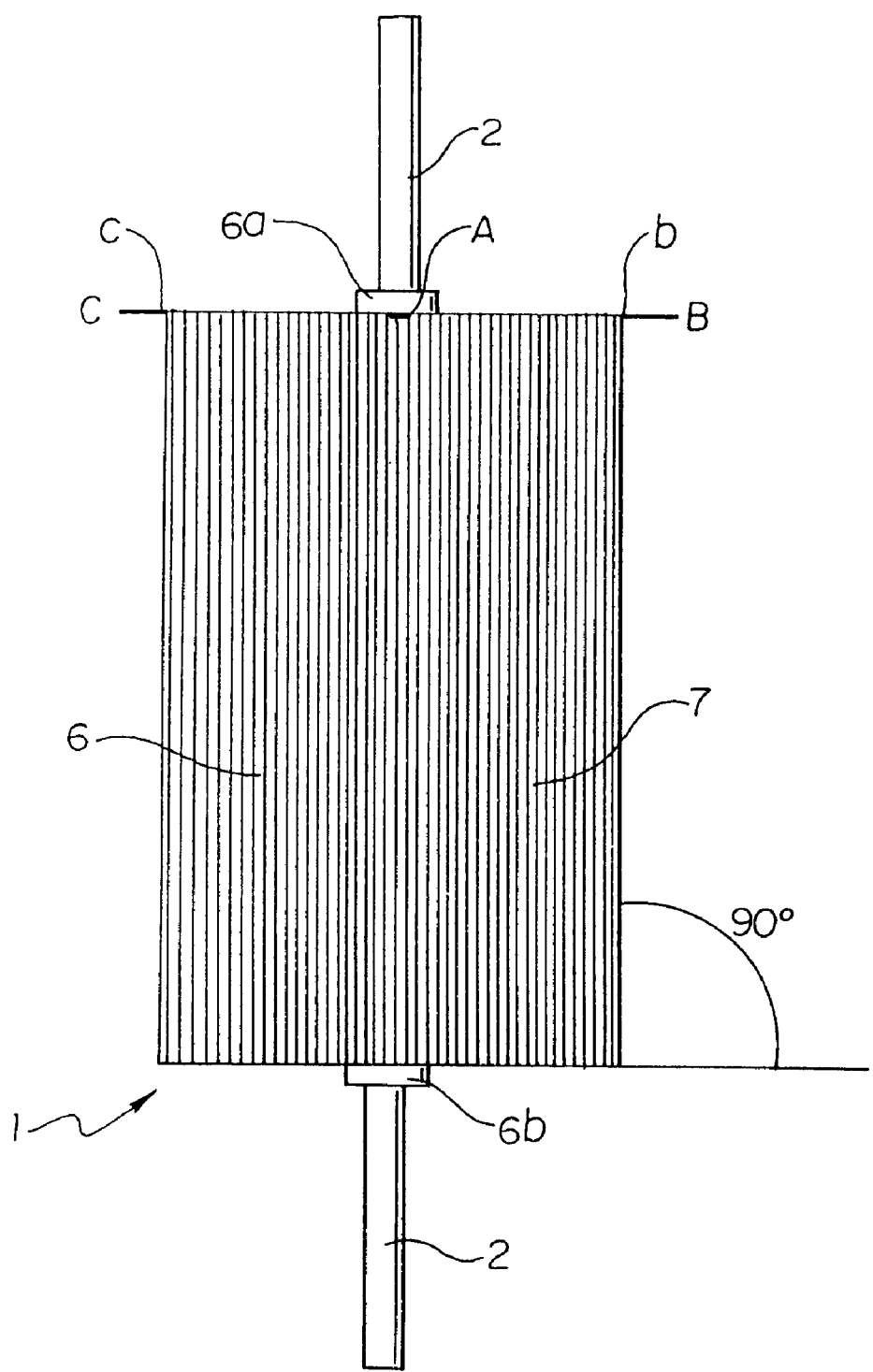
FIG. 5 is a side view, showing the appearance of an armature coil produced through the method according to the primary embodiment of this invention.
Figure 6:
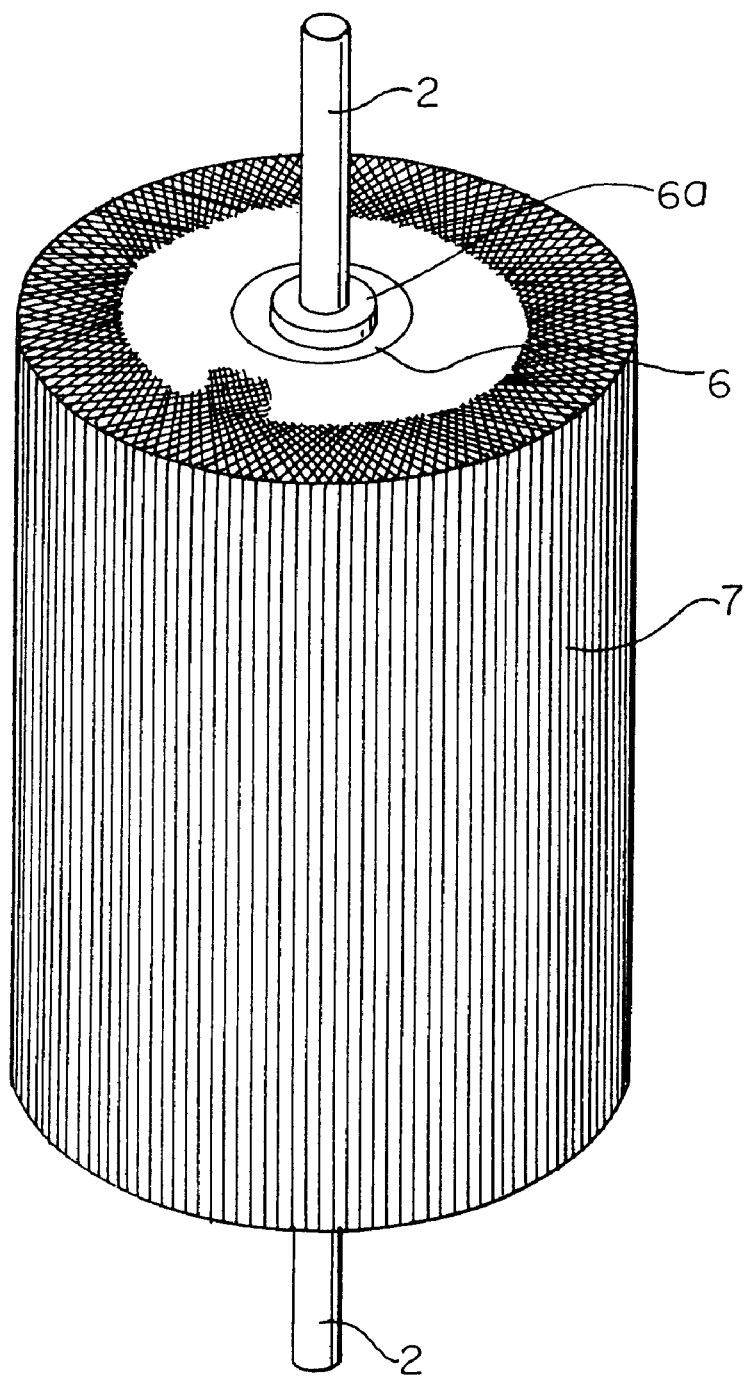
FIG. 6 is a perspective view, showing the construction of the armature coil produced through the method according to the primary embodiment of this invention.

FIG. 3 is a view, schematically showing an armature coil winding method in accordance with the primary embodiment of the present invention. FIGS. 4a and 4b are plan views, showing the above winding method. FIG. 5 is a side view, showing the appearance of an armature coil produced through the above method. FIG. 6 is a perspective view, showing the construction of the armature coil produced through the above method.

As shown in the drawings, the primary embodiment of this invention provides a method of winding an armature coil on a cylindrical resin insulator for coreless motors, with a shaft axially, centrally extending from each end of the cylindrical insulator to a predetermined length, comprising the first step of regularly, angularly dividing the upper surface of the insulator so as to form a plurality of odd equivalent sections on the insulator, with a plurality of odd terminals a, b and c being positioned at junctions between the equivalent sections while carrying a plurality of odd finishing coils A, B and C. After the dividing step, a coil is repeatedly wound on the cylindrical insulator in a way such that the coil starts from the terminal "a" and terminates at the finishing coil "B" of the terminal "b". In such a case, each turn of the coil linearly extends on the upper surface of the insulator, vertically extends down on the sidewall of the insulator, linearly extends on the lower surface of the insulator, and vertically extends up on the sidewall of the insulator.

Thereafter, another coil is repeatedly wound on the cylindrical insulator in a way such that the coil starts from the finishing coil "B" of the terminal "b" and terminates at the finishing coil "C" of the terminal "c". In such a case, each turn of the coil linearly extends on the upper surface of the insulator, vertically extends down on the sidewall of the insulator, linearly extends on the lower surface of the insulator, and vertically extends up on the sidewall of the insulator. A further coil is, thereafter, repeatedly wound on the cylindrical insulator in a way such that the coil starts from the finishing coil "C" of the terminal "c" and terminates at the finishing coil "A" of the terminal "a". In such a case, each turn of the coil linearly extends on the upper surface of the insulator, vertically extends down on the sidewall of the insulator, linearly extends on the lower surface of the insulator, and vertically extends up on the sidewall of the insulator.

Figure 7:
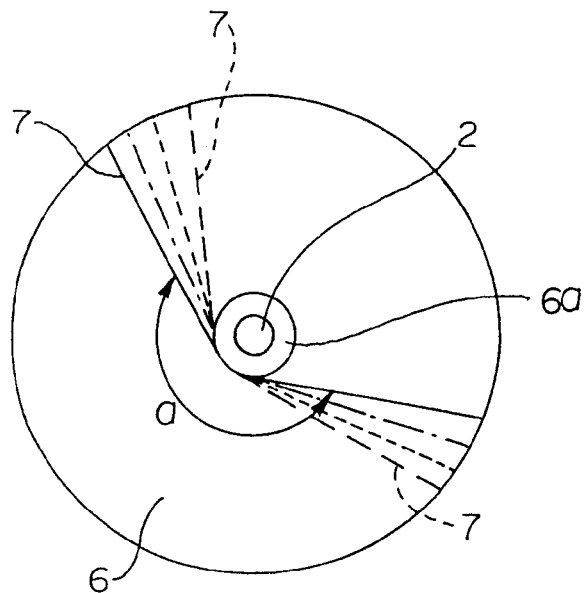
FIG. 7 is a view, schematically showing an armature coil winding method in accordance with the second embodiment of the present invention.
Figure 8:
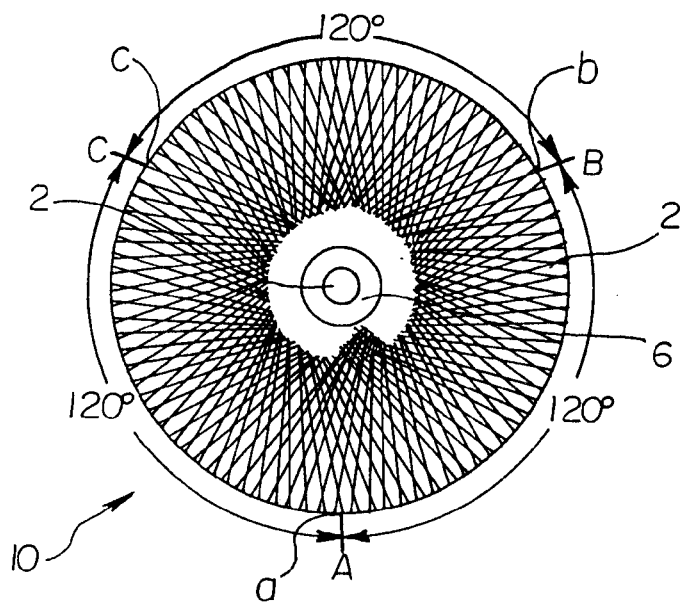
FIG. 8 is a plan view, showing the armature coil winding method according to the second embodiment of this invention.
Figure 9:
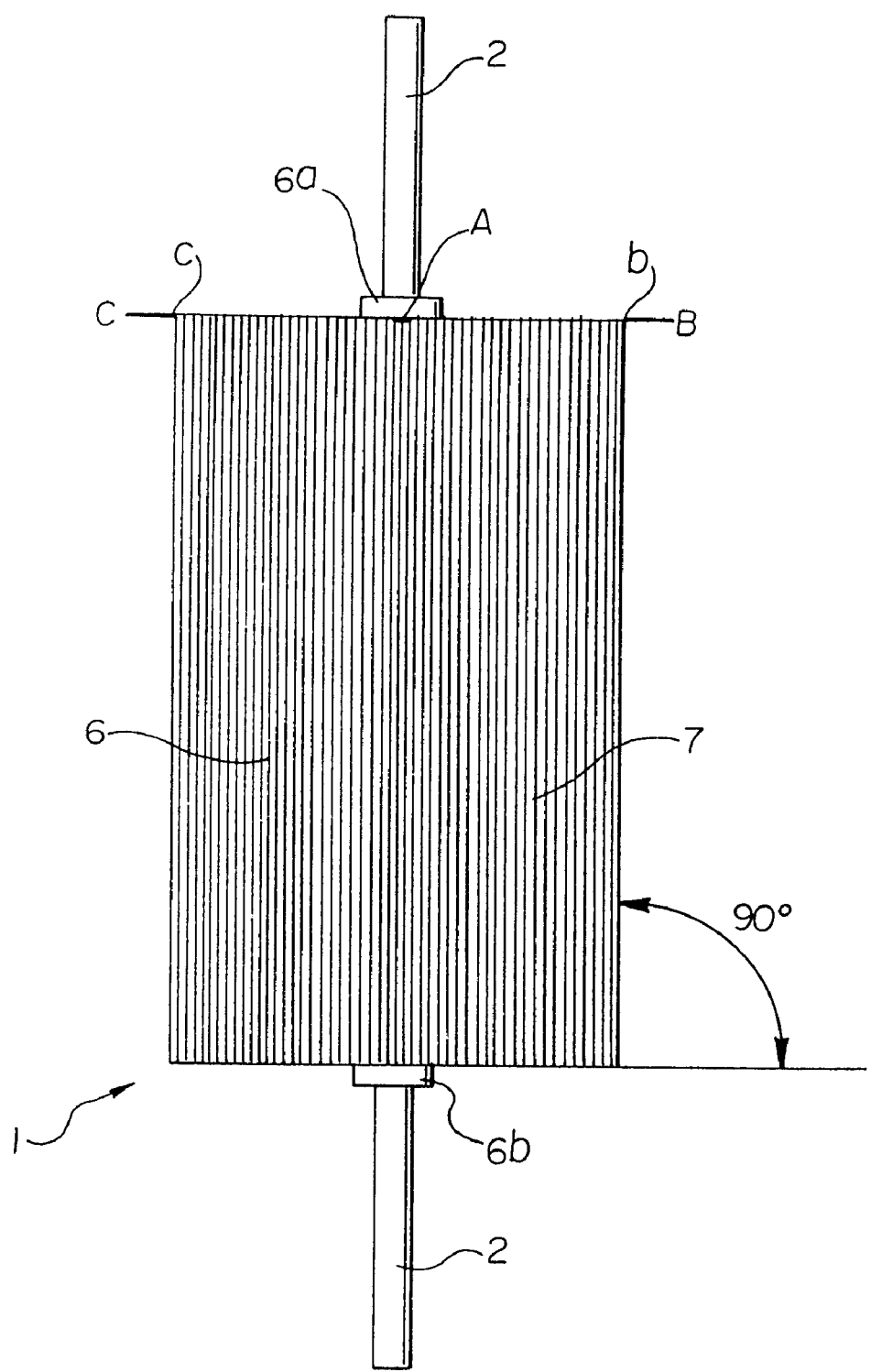
FIG. 9 is a side view, showing the appearance of an armature coil produced through the method according to the second embodiment of this invention.
Figure 10:
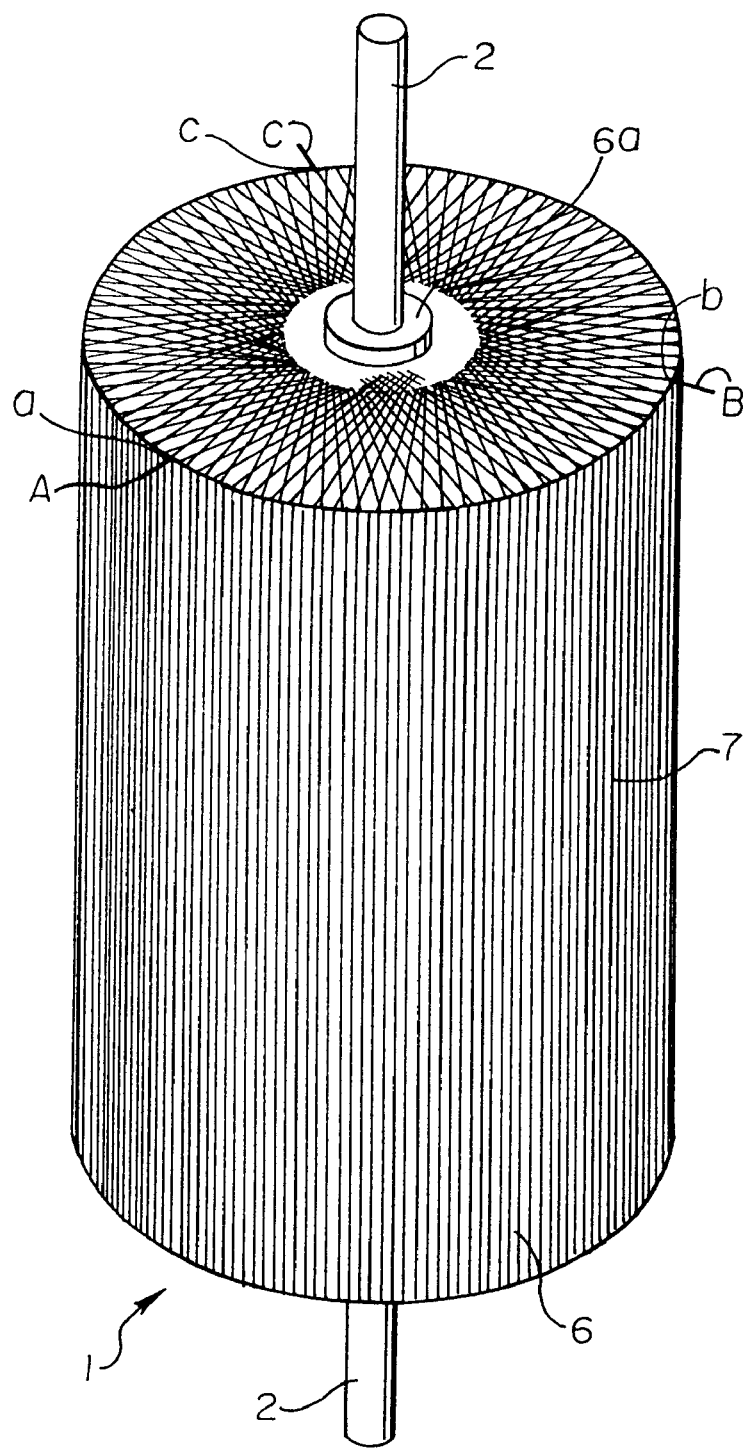
FIG. 10 is a perspective view, showing the construction of the armature coil produced through the method according to the second embodiment of this invention.

On the other hand, FIG. 7 is a view, schematically showing an armature coil winding method in accordance with the second embodiment of this invention. FIG. 8 is a plan view, showing the above armature coil winding method. FIG. 9 is a front view, showing the appearance of an armature coil produced through the method according to the second embodiment. FIG. 10 is a perspective view, showing the construction of the above armature coil.

As shown in the drawings, the second embodiment of this invention provides a method of winding an armature coil on a cylindrical resin insulator for coreless motors, with a shaft axially, centrally extending from each end of the cylindrical insulator to a predetermined length, comprising the first step of regularly, angularly dividing an upper surface of the insulator so as to form a plurality of odd equivalent sections on the insulator, with a plurality of odd terminals a, b and c being positioned at junctions between the equivalent sections while carrying a plurality of odd finishing coils A, B and C. After the dividing step, a coil is repeatedly wound on the cylindrical insulator in a way such that the coil starts from the terminal "a" and terminates at the finishing coil "B" of the terminal "b". In such a case, each turn of the coil extends on the upper surface of the insulator while passing over the sidewall of an upper center projection integrated with the upper surface, vertically extends down on the sidewall of the insulator, extends on the lower surface of the insulator while passing over the sidewall of a lower center projection integrated with the lower surface, and vertically extends up on the sidewall of the insulator. Thereafter, another coil is repeatedly wound on the cylindrical insulator in a way such that the coil starts from the finishing coil "B" of the terminal "b" and terminates at the finishing coil "C" of the terminal "c". In such a case, each turn of the coil extends on the upper surface of the insulator while passing over the sidewall of the upper center projection, vertically extends down on the sidewall of the insulator, extends on the lower surface of the insulator while passing over the sidewall of the lower center projection, and vertically extends up on the sidewall of the insulator. A further coil is, thereafter, repeatedly wound on the cylindrical insulator in a way such that the coil starts from the finishing coil "C" of the terminal "c" and terminates at the finishing coil "A" of the terminal "a". In such a case, each turn of the coil extends on the upper surface of the insulator while passing over the sidewall of the upper center projection, vertically extends down on the sidewall of the insulator, extends on the lower surface of the insulator while passing over the sidewall of the lower center projection, and vertically extends up on the sidewall of the insulator.

In each of the above methods, the number of the finishing coils is an odd number of not lower than three, with the finishing coils being positioned at regularly divided angular positions on the upper surface of the insulator.

In addition, each of the coils extends on the upper and lower surfaces of the insulator while forming an outside angle ($\alpha$) of not lower than 180° as expressed by an expression, 180°$\leq\alpha$, thus being stably and uniformly wound on the insulator while the coils are vertically wound on the sidewall of the insulator.

The present invention also provides a coreless motor, formed by winding an armature coil on a cylindrical resin insulator 6, with a shaft 2 axially, centrally extending from each end of the cylindrical insulator 6 to a predetermined length. The coreless motor comprises a primary coil 7 repeatedly wound on the cylindrical insulator 6 in a way such that the coil 7 starts from the terminal "a" of a plurality of odd terminals a, b and c formed on the upper surface of the insulator at regularly, angularly divided points, and terminates at the finishing coil "B" of the terminal "b". The coreless motor also has another coil 7 repeatedly wound on the cylindrical insulator 6 in a way such that the coil 7 starts from the finishing coil "B" of the terminal "b", and terminates at the finishing coil "C" of the terminal "c". In the coreless motor, a further coil 7 is repeatedly wound on the cylindrical insulator 6 in a way such that the coil 7 starts from the finishing coil "C" of the terminal "c", and terminates at the finishing coil "A" of the terminal "a". In the above coreless motor, each turn of the coils 7 linearly extends on the upper and lower surfaces of the insulator 6 and vertically extends on the sidewall of the insulator 6, thus improving magnetic flux distribution efficiency relative to magnetic force.

Another embodiment of the present invention also provides a coreless motor, formed by winding an armature coil on a cylindrical resin insulator 6, with a shaft 2 axially, centrally extending from each end of the cylindrical insulator to a predetermined length. In this embodiment, a primary coil 7 is repeatedly wound on the cylindrical insulator in a way such that the coil 7 starts from the terminal "a" of a plurality of odd terminals a, b and c formed on the upper surface of the insulator at regularly, angularly divided points, and terminates at the finishing coil "B" of the terminal "b". The coreless motor also has another coil 7 repeatedly wound on the cylindrical insulator 6 in a way such that the coil 7 starts from the finishing coil "B" of the terminal "b", and terminates at the finishing coil "C" of the terminal "c". In the coreless motor, a further coil 7 is repeatedly wound on the cylindrical insulator 6 in a way such that the coil 7 starts from the finishing coil "C" of the terminal "c", and terminates at the finishing coil "A" of the terminal "a". In the above coreless motor, each turn of the coils 7 extends on the upper and lower surfaces of the insulator 6 while passing over the sidewalls of upper and lower center projections 6a and 6b integrated with the upper and lower surfaces of the insulator 6, and vertically extends on the sidewall of the insulator 6, thus being stably and uniformly wound on the insulator 6.

In each of the above coreless motors, each of the coils 7 extends on the upper and lower surfaces of the insulator 6 while forming an outside angle ($\alpha$) of not lower than 180° as expressed by an expression, 180°$\leq\alpha$, thus being stably and uniformly wound on the insulator while the coils are vertically wound on the sidewall of the insulator.

In the armature coil winding method of this invention, the coils 7 are wound on the insulator 6 while being regularly spaced apart from each other. In the preferred embodiments of the drawings, the three finishing coils A, B and C of the terminals a, b and c are angularly spaced apart from each other at an angle of 120°. Of course, the number of the finishing coils may be changed from three to five, seven or nine as desired without affecting the functioning of this invention.

In order to wind the armature coil on the cylindrical resin insulator 6 according to the primary embodiment of this invention, the upper surface of the insulator 6 is regularly, angularly divided to form a plurality of odd terminals a, b and c at junctions between equivalent sections, with a plurality of odd finishing coils A, B and C being positioned at the terminals 1, b and c. After the dividing step, a primary coil 7 is repeatedly wound on the cylindrical insulator as follows. That is, the coil 7 is wound on the insulator 6 while starting from the terminal "a" and terminating at the finishing coil "B" of the terminal "b". In such a case, each turn of the coil 7 primarily linearly extends on the upper surface of the insulator 6.

Thereafter, the coil 7 vertically extends down on the sidewall of the insulator 6 and linearly extends on the lower surface of the insulator 6 prior to vertically extending up on the sidewall of the insulator 6. This coil winding process ends at the finishing coil "B" of the terminal "b".

In order to wind the armature coil on the cylindrical resin insulator 6 according to the second embodiment of this invention, the upper surface of the insulator 6 is regularly, angularly divided to form a plurality of odd terminals a, b and c, with a plurality of odd finishing coils A, B and C being positioned at the terminals 1, b and c in the same manner as that described for the primary embodiment. After the dividing step, a primary coil 7 is repeatedly wound on the cylindrical insulator as follows. That is, the coil 7 is wound on the insulator 6 while starting from the terminal "a" and terminating at the finishing coil "B" of the terminal "b". In such a case, each turn of the coil 7 primarily extends on the upper surface of the insulator 6 while passing over the sidewall of the upper center projection 6a of the insulator 6.

Thereafter, the coil 7 vertically extends down on the sidewall of the insulator 6 and extends on the lower surface of the insulator 6 while passing over the sidewall of the lower center projection 6b prior to vertically extending up on the sidewall of the insulator 6. This coil winding process ends at the finishing coil "B" of the terminal "b".

In the above armature coil winding methods, the process of winding the coil 7, starting from the finishing coil "B" of the terminal "b" and terminating at the finishing coil "C" of the terminal "c", and the process of winding the coil 7, starting from the finishing coil "C" of the terminal "c" and terminating at the finishing coil "A" of the terminal "a", remain the same as that described for the primary coil 7 and further explanation is thus not deemed necessary.

During the armature coil winding process, each of the coils 7 extends on the upper and lower surfaces of the insulator 6 while forming an outside angle (α) of not lower than 180° as expressed by an expression, 180°≦α. The coils 7 are thus stably and uniformly wound on the insulator 6 while they are vertically wound on the sidewall of the insulator 6. This finally allows the coils 7 to be firmly wound on the insulator 6.

In the method of winding an armature coil 7 on the cylindrical resin insulator 6 according to the present invention, the coil 7 passes on the upper and lower surfaces of the insulator 6 linearly or while passing over the sidewalls of the upper and lower center projections 6a and 6b of the insulator 6. The coil 7 thus accomplishes a desired magnetic flux distribution angle of 90° relative to magnetic force. Such a magnetic flux distribution angle of 90° results in a magnetic flux distribution of sin 90° (=1), thus generating a desired torque by an application of a low current and conserving electricity during an operation of a resulting coreless motor.

As described above, the present invention provides a method of winding an armature coil on a cylindrical resin insulator while improving magnetic flux efficiency of the coil. This method allows a resulting coreless motor to effectively generate desired torque by an application of a low current so as to conserve electricity, and to simplify the production process of the motor so as to reduce the production cost of the motor, thus finally improving productivity and economical efficiency of the coreless motors. The present invention also provides a coreless motor produced through such a method. In order to wind an armature coil on a cylindrical resin insulator according to the primary embodiment of this invention, the coil is repeatedly wound on the insulator in a way such that each turn of the coil primarily linearly extends on the upper surface of the insulator, vertically extends down on the sidewall of the insulator and linearly extends on the lower surface of the insulator prior to vertically extending up on the sidewall of the insulator. In the second embodiment, the coil is repeatedly wound on the cylindrical resin insulator in a way such that each turn of the coil primarily extends on the upper surface of the insulator while passing over the sidewall of an upper center projection of the insulator, vertically extends down on the sidewall of the insulator and extends on the lower surface of the insulator while passing over the sidewall of a lower center projection prior to vertically extending up on the sidewall of the insulator. The method of this invention improves magnetic flux efficiency of the coil, thus allowing a resulting coreless motor to precisely vibrate. The method of this invention thus produces coreless motors, which have improved operational reliability and improve the operational efficiency, operational reliability and market competitiveness of resulting cellular phones.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of winding an armature coil on a cylindrical resin insulator for coreless motors, with a shaft axially, centrally extending from each end of said cylindrical insulator to a predetermined length, comprising the steps of:

regularly, angularly dividing an upper surface of said insulator so as to form a plurality of odd equivalent sections, with a plurality of odd terminals (a, b and c) being positioned at junctions between the equivalent sections while carrying the same odd number of finishing coils (A, B and C);

repeatedly winding a coil on said cylindrical insulator in a way such that said coil starts from said terminal (a) and terminates at the finishing coil (B) of the terminal (b), with each turn of said coil linearly extending on the upper surface of the insulator, vertically extending down on a sidewall of said insulator, linearly extending on a lower surface of the insulator and vertically extending up on said sidewall;

repeatedly winding another coil on said cylindrical insulator in a way such that said coil starts from said finishing coil (B) of the terminal (b) and terminates at the finishing coil (C) of the terminal (c), with each turn of said coil linearly extending on the upper surface of the insulator, vertically extending down on the sidewall of the insulator, linearly extending on the lower surface of the insulator and vertically extending up on the sidewall of said insulator; and repeatedly winding a further coil on said cylindrical insulator in a way such that said coil starts from said finishing coil (C) of the terminal (c) and terminates at the finishing coil (A) of the terminal (a), with each turn of said coil linearly extending on the upper surface of the insulator, vertically extending down on the sidewall of the insulator, linearly extending on the lower surface of the insulator and vertically extending up on the sidewall of said insulator.

2. A method of winding an armature coil on a cylindrical resin insulator for coreless motors, with a shaft axially, centrally extending from each end of said cylindrical insulator to a predetermined length, comprising the steps of:

regularly, angularly dividing an upper surface of said insulator so as to form a plurality of odd equivalent sections, with a plurality of odd terminals (a, b and c) being positioned at junctions between the equivalent sections while carrying the same odd number of finishing coils (A, B and C);

repeatedly winding a coil on said cylindrical insulator in a way such that said coil starts from said terminal (a) and terminates at the finishing coil (B) of the terminal (b), with each turn of said coil extending on the upper surface of the insulator while passing over a sidewall of an upper center projection integrated with said upper surface, vertically extending down on a sidewall of said insulator, extending on a lower surface of the insulator while passing over a sidewall of an lower center projection integrated with said lower surface, and vertically extending up on said sidewall of the insulator;

repeatedly winding another coil on said cylindrical insulator in a way such that said coil starts from said finishing coil (B) of the terminal (b) and terminates at the finishing coil (C) of the terminal (c), with each turn of said coil extending on the upper surface of the insulator while passing over the sidewall of said upper center projection, vertically extending down on the sidewall of said insulator, extending on the lower surface of the insulator while passing over the sidewall of said lower center projection, and vertically extending up on said sidewall of the insulator; and repeatedly winding a further coil on said cylindrical insulator in a way such that said coil starts from said finishing coil (C) of the terminal (c) and terminates at the finishing coil (A) of the terminal (a), with each turn of said coil extending on the upper surface of the insulator while passing over the sidewall of said upper center projection, vertically extending down on the sidewall of said insulator, extending on the lower surface of the insulator while passing over the sidewall of said lower center projection, and vertically extending up on said sidewall of the insulator.

3. The method according to claim 1 or 2, wherein the number of said finishing coils is an odd number of not lower than three, with the finishing coils being positioned at regularly divided angular positions on the upper surface of the insulator.

4. The method according to claim 1 or 2, wherein each of the coils extends on the upper and lower surfaces of said insulator while forming an outside angle ($\alpha$) of not lower than 180° as expressed by an expression, $180° \leq \alpha$, thus being stably and uniformly wound on the insulator while the coils are vertically wound on the sidewall of the insulator.

5. A coreless motor, formed by winding an armature coil on a cylindrical resin insulator, with a shaft axially, centrally extending from each end o f said cylindrical insulator to a predetermined length, comprising:

a primary coil repeatedly wound on said cylindrical insulator in a way such that said coil starts from one terminal (a) of a plurality of odd terminals (a, b and c) form ed on an upper surface of said insulator at regularly, angularly divided points, and terminates at a finishing coil (B) of the terminal (b);

another coil repeatedly wound on said cylindrical insulator in a way such that said coil starts from the finishing coil (B) of the terminal (b), and terminates at a finishing coil (C) of the terminal (c); and a further coil repeatedly wound on said cylindrical insulator in a way such that said coil starts from the finishing coil (C) of the terminal (c), and terminates at a finishing coil (A) of the terminal (a), whereby each turn of said coils linearly extends on the upper and lower surfaces of the insulator and vertically extends on a sidewall of the insulator, thus improving magnetic flux distribution efficiency relative to magnetic force.

6. A coreless motor, formed by winding an armature coil on a cylindrical resin insulator, with a shaft axially, centrally extending from each end of said cylindrical insulator to a predetermined length, comprising:

a primary coil repeatedly wound on said cylindrical insulator in a way such that said coil starts from one terminal (a) of a plurality of odd terminals (a, b and c) formed on an upper surface of said insulator at regularly, angularly divided points, and terminates at a finishing coil (B) of the terminal (b);

another coil repeatedly wound on said cylindrical insulator in a way such that said coil starts from the finishing coil (B) of the terminal (b), and terminates at a finishing coil (C) of the terminal (c); and a further coil repeatedly wound on said cylindrical insulator in a way such that said coil starts from the finishing coil (C) of the terminal (c), and terminates at a finishing coil (A) of the terminal (a), whereby each turn of said coils extends on the upper and lower surfaces of the insulator while passing over sidewalls of upper and lower center projections integrated with said upper and lower surfaces of the insulator, and vertically extends on a sidewall of the insulator, thus being stably and uniformly wound on the insulator.

7. The coreless motor according to claim 5 or 6, wherein each of the coils extends on the upper and lower surfaces of said insulator while forming an outside angle ($\alpha$) of not lower than 180° as expressed by an expression, $180° \leq \alpha$, thus being stably and uniformly wound on the insulator while the coils are vertically wound on the sidewall of the insulator.

* * * * *